US008140611B1

(12) United States Patent
Miller et al.

(10) Patent No.: US 8,140,611 B1
(45) Date of Patent: Mar. 20, 2012

(54) METHOD AND REPRESENTATIONS FOR EXPORTING TACTICAL DATA LINK INFORMATION AS A WEB SERVICE

(75) Inventors: Frank W. Miller, Baltimore, MD (US); Richard Waldschmidt, McKinney, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1389 days.

(21) Appl. No.: 11/448,645

(22) Filed: Jun. 7, 2006

(51) Int. Cl.
*G06F 15/16* (2006.01)
*G06F 3/00* (2006.01)

(52) U.S. Cl. .................. 709/201; 709/203; 715/738

(58) Field of Classification Search .................. 709/201, 709/203; 370/252; 715/738
See application file for complete search history.

(56) References Cited

U.S. PATENT DOCUMENTS

| | | | |
|---|---|---|---|
| 6,748,426 B1 * | 6/2004 | Shaffer et al. | 709/219 |
| 6,873,886 B1 * | 3/2005 | Mullen et al. | 701/2 |
| 7,502,884 B1 * | 3/2009 | Shah et al. | 710/316 |
| 2003/0199266 A1 * | 10/2003 | Zavidniak | 455/410 |
| 2004/0162642 A1 * | 8/2004 | Gasper et al. | 700/286 |
| 2004/0174822 A1 * | 9/2004 | Bui | 370/252 |
| 2005/0195096 A1 * | 9/2005 | Ward et al. | 340/995.14 |
| 2010/0229082 A1 * | 9/2010 | Karmarkar et al. | 715/205 |

OTHER PUBLICATIONS

Variable Message Format (VMF) Testing Program; Joint Interoperability Test Command, PO Box 12798, Fort Huachuca, AZ 85670-2798; http://jitc.fhu.disa.mil/brochure/vmf.pdf; Revised: Jan. 2005.

* cited by examiner

*Primary Examiner* — David E. England
*Assistant Examiner* — Clarence John
(74) *Attorney, Agent, or Firm* — Donna P. Suchy; Daniel M. Barbieri

(57) ABSTRACT

A scalable method and apparatus for performing a mashup of military Situation Awareness (SA) data in a tactical data link (TDL) with data residing in several databases, using a web server-web browser architecture over an IP-based network. In a preferred embodiment the invention employs a TDL gateway to collect and correlate SA data from a TDL and stores the data in a track database, which is interfaced by a web server to the IP-based network. A SA web browser interfaces with the TDL gateway web server, a maps server and a symbology server to mash data from a plurality of sources into an integrated whole, allowing a more complete graphical representation of the SA data. The invention is capable of operating in reverse, to inject user defined data from the SA web browser into the TDL.

11 Claims, 2 Drawing Sheets

METHOD AND REPRESENTATIONS FOR EXPORTING TACTICAL DATA LINK INFORMATION AS A WEB SERVICE

CROSS-REFERENCE TO RELATED APPLICATIONS

[none]

BACKGROUND OF THE INVENTION

1. Field of Invention

The present invention relates generally to the field of command, control, communications, computer, intelligence surveillance, and reconnaissance (C4ISR) hardware and software systems and components.

2. Description of Related Art

At present a disparate number of data, message, and circuit switching systems and equipment communicate with one another over a range of network systems, ranging from tactical, squad-level systems, to strategic, headquarters-level systems, over a plurality of transmission systems including tactical line-of-sight; combat net radios; high frequency, microwave and troposphere scatter systems; fiber optic cable; telephone lines; and satellite links. These transmission systems when used in a military context can be termed a Tactical Data Link (TDL). Often it is necessary to superimpose and combine data from a TDL onto data from another source (e.g., a "mashup"). A mashup is a function of a web application that seamlessly performs the acquisition, combination, and integrated presentation of data from multiple websites; a mashup is a web application that seamlessly combines content from more than one source into an integrated whole. The best known example is to acquire database information from a website that includes a geographical component and to "mash" that against content from a graphical maps website, i.e. Google Maps, thereby presenting the database information in its geographic context visually. Another example might be a website that polls several other websites for pricing information and then presents the results ordered from lowest cost to highest cost to allow a user to do price comparisons.

In the present invention a simple example of a mashup might be to superimpose data acquired from a scout in the field that has sighted an enemy target using a GPS locator with an colored icon of the enemy target indicating what type of target it is, superimposed onto a terrain map of where the enemy target is situated, so an end user, e.g., an officer, can more readily make strategic and tactical decisions.

What is lacking in the prior art is a method and apparatus performing such a mashup using an IP network with a web server-web browser architecture, and for exporting tactical data link information as a web service, such as taught in the present invention.

SUMMARY OF THE INVENTION

Accordingly, an aspect of the present invention is to provide an automated computer driven system and method of performing a mashup using an IP-based network with a web server-web browser architecture, and for exporting tactical data link information as a web service to web servers and web browsers within the IP-based network.

To this end TDL information or data in the form of messages is collected from a TDL and fed into a TDL Gateway, which employs a gateway function to correlate TDL messages to produce a database of Situational Awareness (SA) tracks, or correlated, normalized data relating to the TDL messages. A web server then exports this information from the track database to an IP network, whenever there are queries requested by a SA web browser, which is controlled by an end user. The SA web browser is also responsible for performing a mashup with other servers, such as for example a maps server and a symbology server, as explained herein, to produce a composite, unified and integrated graphical amalgam of data from a plethora of potentially disparate sources.

A further aspect of the invention is to employ the system and method of the present invention "in reverse", so that a client web browser is used to post data to a web server for insertion into the Track Database and, via the TDL Gateway, injection of this information into the TDL.

The sum total of all of the above advantages, as well as the numerous other advantages disclosed and inherent from the invention described herein, creates an improvement over prior techniques.

The above described and many other features and attendant advantages of the present invention will become apparent from a consideration of the following detailed description when considered in conjunction with the accompanying drawings.

BRIEF DESCRIPTION OF THE DRAWINGS

Detailed description of preferred embodiments of the invention will be made with reference to the accompanying drawings. Disclosed herein is a detailed description of the best presently known mode of carrying out the invention. This description is not to be taken in a limiting sense, but is made merely for the purpose of illustrating the general principles of the invention. The section titles and overall organization of the present detailed description are for the purpose of convenience only and are not intended to limit the present invention.

Figure 1:
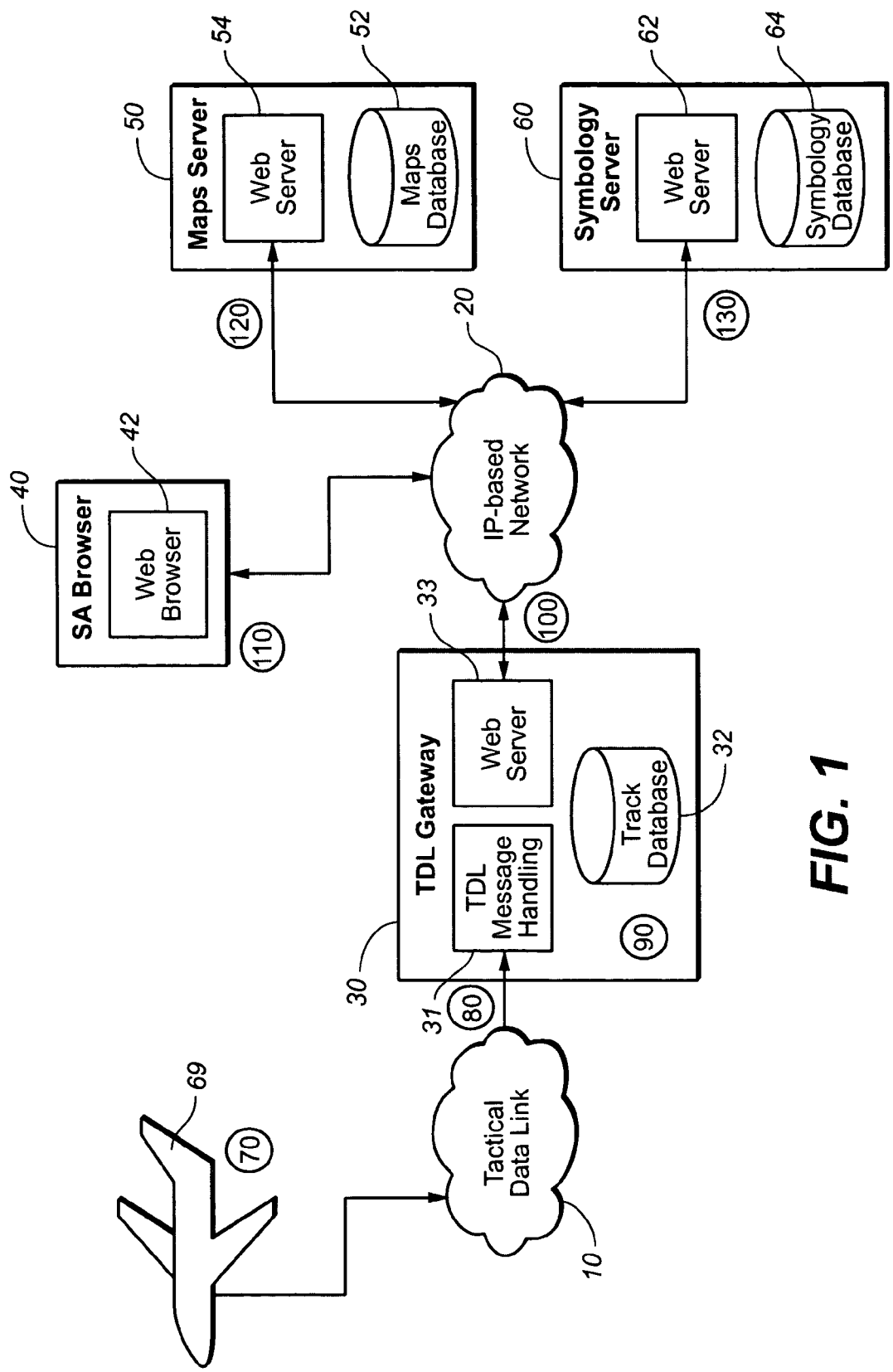
FIG. 1 is a block diagram detailing the TDL and IP network of the present invention.

It should be understood that one skilled in the art may, using the teachings of the present invention, vary embodiments shown in the drawings without departing from the spirit of the invention herein. In the figures, elements with like numbered reference numbers in different figures indicate the presence of previously defined identical elements.

DETAILED DESCRIPTION OF THE INVENTION

The method and apparatus of the present invention is a computing platform running a software tool, which can accept human input, and may be written in any computer language (such as C, C++, Perl, Java or the like) run by a computer system having an operating system. The computer system typically has one or more processors, primary and secondary memory cooperating with the processor(s), which executes instructions stored in the memory, I/O means such as monitor, mouse and keyboard, and any necessary specialized hardware or firmware. Depending on the language used to construct and implement the software tool, the source code, object code and/or executables of the tool may have any number of classes, functions, objects, variables, templates, lines of code, portions of code and constructs (collectively and generally, "a process step", "step", "block", "functional module" or "software module") to carry out the invention in successive stages as described and taught herein, and may be either a standalone software application, or employed inside of or called by another software application, or as firmware. The software process or software module may be constructed so that one portion of code in the application performs a plurality of functions, as for instance in Object Oriented programming (e.g., an overloaded process). The converse is also true, in that a plurality of portions of code could perform a plurality of functions, and still be functionally the same as a single portion of code. At any stage of the process step of the present invention, intermediate values, variables and data may be stored for later use by the program. In addition, the binary executable or source code data comprising the software of the present invention may reside on computer readable storage medium (e.g., a magnetic disk, which may be portable); memory (e.g., flash RAM); DVD or CD-ROM.

Turning attention to FIG. 1, there is shown a block diagram schematic of the method and apparatus of the present invention, connecting a Tactical Data Link (TDL) 10 to an IP network 20 (i.e. TCP/IP). The TDL 10 is shown as a cloud 10. The cloud reduces the entire TDL communications network into points of entry and exit. It infers there may be any number of switches, routers, trunks, and other network devices within the cloud, for example network devices comprising tactical line-of-sight systems; radio communications such as combat net radios; high frequency, microwave and troposphere scatter systems; fiber optic cable; telephone lines; and satellite links. Each of these systems pass sometimes data, often as binary messages, such as Situational Awareness (SA) message data (data relating to military matters including but not limited to target acquisition and identification of hostile and friendly forces), in a variety of formats, including but not limited to Link-11 (MIL-STD-6011), Link-16-J-Series (e.g. MIL-STD-6016C), MIL-STD-6017 (Variable Message Format (VMF)). Disparate pieces of military hardware in a TDL often have their own format for data transmission. The present invention contemplates accommodating any past, present or future message format.

A TDL Gateway block or TDL Gateway Server 30, employing a TDL Message Handling block 31, would collect Situational Awareness (SA) messages from the TDL cloud 10, correlate the SA messages and store the results in a Track database 32 accessible to the TDL Gateway. More generally the collection, correlation and storing of message data from the TDL can be termed processing of the data by the TDL Gateway block 30. Each SA message in TDL 10 would have at least one "track" associated with it. Generally the present invention envisions only a single track per message, but in general it is possible to have many tracks per message. For example, three SA messages might be received by the TDL Gateway 30, each comprising an identification of an enemy tank. One message may be from an AWACs surveillance plane, another message from a spy satellite, and a third message from a scout in the field employing a GPS transmitter/receiver. The three SA messages would be related to one another, because they relate to the same enemy tank, and can thus be correlated, because though they come from possibly disparate hardware they likely share one or more pieces of data, say the common GPS location of the enemy tank. The track associated with each of these SA messages would link the three messages as relating to the same target. Some SA messages even have a field for "track" embedded in the message, which makes correlation more easy.

The correlation of SA messages may be done by software residing in the TDL Gateway block 30, and the correlation can be either rules based (e.g. MIL-STD-6016) or statistics based. Rules based correlation is based on the "track quality" which is a parameter that is included in most of the TDL messages. The track quality is assigned by the generator of the track information to give the receiver of the message an indication in the "confidence" of track information. Any number of rules-based correlations may be employed, with no particular preferred methodology. As far as statistical correlation is concerned, a variety of different techniques may be employed with no particular preferred methodology, e.g. regression analysis and/or a Pearson product-moment correlation coefficient can be used to correlate SA messages.

An SA track can be considered a "normalized" track meaning that any data that resides in the Track database 32 has generally already been correlated. Since a target can be observed by multiple observers, all of which then generate their own track messages, the TDL Gateway block 30, which correlates these incoming messages, figures out that several messages might actually refer to the same actual target and sticks a single "track" in the database to link to these messages.

In the present invention encryption/decryption happens at the physical layer, not at the functional and logical level shown in the figures. Thus track messages are generally not encrypted on a message basis.

The TDL Gateway block 30 also contains a TDL Gateway Web Server block 33. The web server 33 interfaces the TDL Gateway block 30 (e.g. allowing access to the Track database 32) to allow communication over the IP-based network 20 and connect with other blocks. The web server block 33 may be a separate computer (an application server comprising both hardware and software) from the TDL Gateway block 30, that delivers Web pages to client web browsers and client applications via the HTTP protocol, such as SA client browser 40 as explained further herein. Thus the web server 33 may include the hardware, operating system, Web server software, TCP/IP protocols and site content (Web pages and other files). The Web server 33 may be used internally as part of an intranet (i.e. if the IP-based network 20 is a LAN), or over a WAN, but in either case the IP-based network can be termed the "internet". Preferably in the present invention the web server 33 is linked to the internet or Web (i.e. the IP-based network 20) and is a secure web server.

The web server 33 may in the alternative be just the software residing in the computer hardware comprising the TDL Gateway block 30 and not an entire separate computer system. In such cases, the web server 33 would be the software that services HTTP requests—i.e. an HTTP server such as IIS, Apache and the like—that manages requests from the browser such as HTTP requests, headers and codes, and delivers HTML documents and files in response. The software of the web server 33 would also execute server-side scripts (CGI scripts, JSPs, ASPS, and the like) that provide functions such as database searching. The software of the web server 33 in an internet environment would host a variety of language systems used to program database queries (e.g. SQL language). These scripts and services, such as JavaScript and Java server pages (JSPs), would typically access the Track database 32 to retrieve up-to-date data that is presented to users via their browsers or client applications, such as SA client browser 40.

For large sites, multiple computers may be used for both application servers and Web servers (HTTP servers), and the software residing therein may be distributed objects software.

A SA Browser 40 (the web client) is the interface for the user and connection to the web servers over the IP network of the present invention. Though only one SA Browser 40 is shown in FIG. 1, in practice many such web clients may be present. The SA Browser 40 in a user's machine would typically incorporate a front end interface in the form of a web browser 42 (e.g. Microsoft Internet Explorer). The SA Browser 40 may also incorporate plug-ins and helper applications that enhance the browser to support special services from the site. The SA Browser 40 may comprise the entire user's computer system (hardware and software), or software alone residing on a server, or a handheld device linked to the IP network 30 that provides Web access, such as a modified Blackberry device with plug-ins for internet access.

An IP network 20, which preferably is a secure network, connects the various blocks comprising the invention such as TDL Gateway block 30, SA Browser block 40, Maps Server block 50 and Symbology Server block 60, which communicate over the IP network 20.

Two other servers, which may be separate hardware and software or just software residing on the same machine as the web browser 42, are used for the present invention, a Maps Server 50 and a Symbology Server 60. More than two servers of these distinct types or of different types may also be employed.

The Maps Server 50 has internet access to a maps database 52 (e.g. Google maps or FalconView) or a local maps database residing on a local hard drive. The maps database 52 is a database of maps, and has graphical representations of earth topography (e.g. in some known image format like PNG format) linked to GPS coordinates and other indicia. The Maps Server 50 has a Maps Web Server 54 as the web server interface to connect with the IP network 20.

The Symbology Server 60 has a Symbology Server Web Server 62 acting as the web server interface to connect with the IP network 20. Symbology Server 60 has access to a symbology database 64, a database of symbols, which stores vector graphic symbols associated with common targets. For example, a friendly target that is an airplane may be represented by a green vector graphic icon of an airplane, with suitable optional alphanumeric indicia indicating the type of aircraft; likewise an enemy target that is a tank may be represented by a red vector graphic icon with suitable optional alphanumeric indicia. The Symbology Server 60 is the most likely of the server types (TDL Gateway server, Maps Server, Symbology Server) to be embedded with the SA Browser 40, rather than as a network service over the IP-based network 20. Thus in claims of the present invention, when referencing the Symbology Server 60, it should be understood by one of ordinary skill using the teachings of the present invention that the Symbology Server 60 may be embedded as part of the SA Browser 40, as a sort of "virtual server" residing in the SA Browser 40, rather than only being a physically distinct and separate server, as shown in FIG. 1. Indeed with the miniaturization and integration of technology as time progresses in the field of computer systems, the same could be true for the Maps Server 50, which could also be embedded with the SA browser and not be physically distinct outside the SA browser system.

The SA Browser 40 is responsible for driving the presentation of the SA data to the user. Conventionally, as web servers do not "push" data to browsers unsolicited, the SA Browser web browser 42 is responsible for polling the web server 33 of the TDL Gateway 30 for data periodically. The SA Browser 40 would poll the TDL Gateway 30, the Maps Server 50, and the Symbology Server 60 as required to provide periodic updates to the SA Browser web browser 42 viewed by the user.

Figure 2:
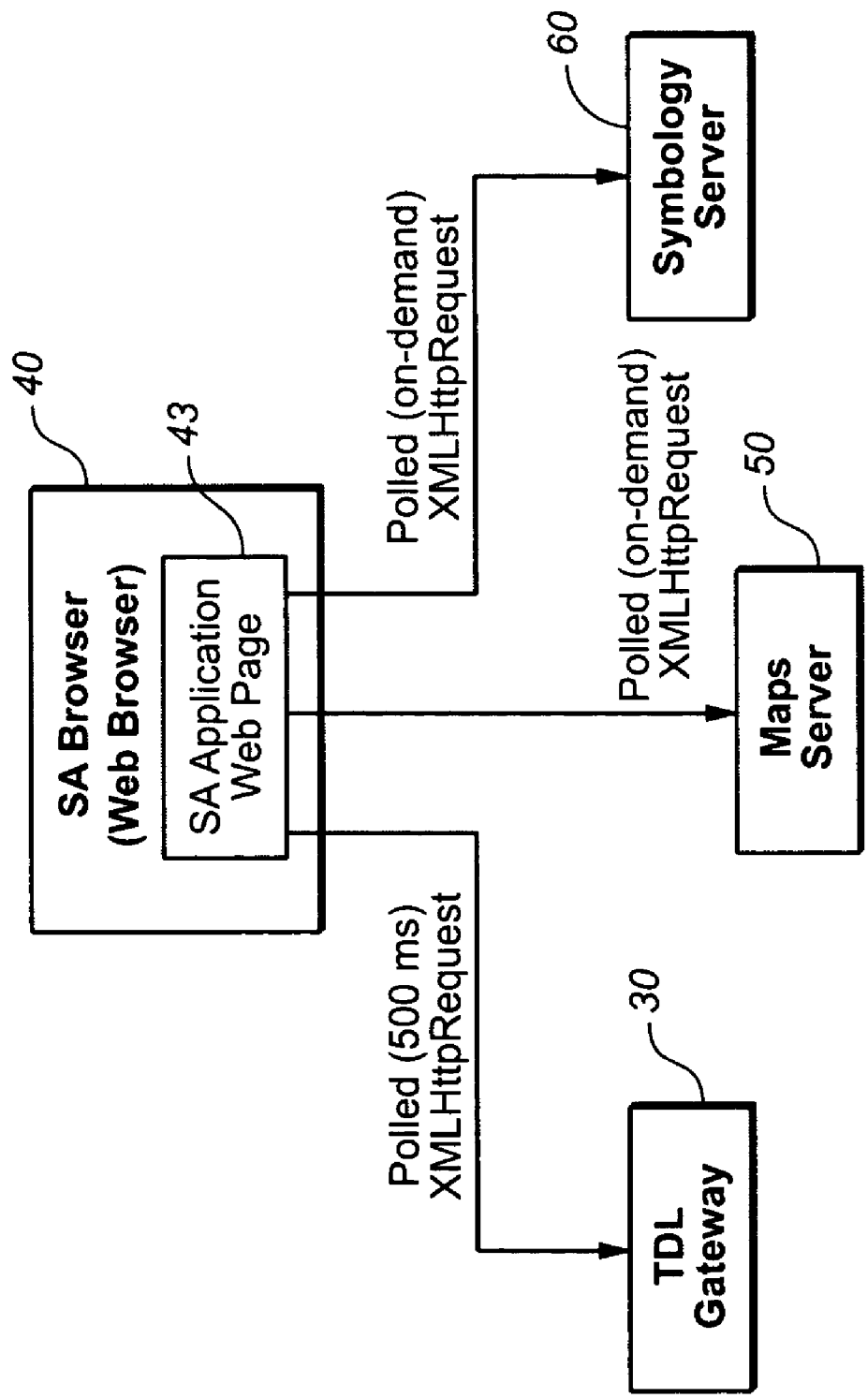
FIG. 2 is a block diagram of an implementation of the SA Browser of the present invention.

FIG. 2 an implementation of the SA Browser 40. The implementation platform is any web browser that supports JavaScript and the XMLHttpRequest asynchronous HTTP request mechanism (an HTTP request); this includes but is not limited to Microsoft Internet Explorer, Mozilla Firefox, Apple Safari, and Opera. The SA Browser 40 is initialized by loading a web page 43 from the web server 33 of the TDL Gateway 30. The TDL Gateway 30 contains the SA Browser application, which can be, by way of example but not of limitation, downloaded to the user's machine, and is written to support a combination of HTML and JavaScript. The SA Browser application of the SA Browser 40 is responsible for four activities: 1) polling the TDL Gateway 33 periodically for TDL SA information as explained herein, 2) polling the Map Server 50 as required to obtain maps that are relevant to the SA information and the user's interactions, 3) polling the Symbology Server 60 periodically for graphical elements that can be used to paint the SA information on the maps, and 4) presenting the combination of these three information sources as a unified map of SA information to the user, as a mashup. The user employs the web browser 42 of the SA Browser 40 as an interface to the Web.

Polling is done via the SA browser, using timers in Javascript. The polling is for XML and XML schema, with communication between web browser client and web server, with typical polling shown in FIG. 2. For example, the SA Browser 40 can poll the TDL Gateway 30 every 500 ms using the XMLHttpRequest asynchronous HTTP request mechanism, and likewise the SA Browser can poll the Maps Server 50 and the Symbology Server 60 on demand. In general any arbitrary time limit can be used.

The information provided by the TDL Gateway 30 is presented using the XML schema discussed above. The information provided by the Map Server 50 is presented in the form of map images in some well-known image format, e.g. Portable Network Graphics (PNG). The information provided by the Symbology Server 60 is presented as a vector graphics representation, e.g. Scalable Vector Graphics (SVG). The SA Browser application in SA Browser 40 paints the appropriate information SA information (e.g. tracks) onto the map images using the appropriate symbols to present a unified, graphical representation of the SA information to the user. Thus the present invention performs a mashup between information residing in the TDL Gateway 30, the SA Browser 40, the Maps Server 50 and the Symbology Server 60.

Turning attention to the functional operation of the present invention, as indicated in FIG. 1, some participant, say an aircraft 69, in the TDL 10 makes an observation that results in the need to transmit a message over the TDL. For example, an aircraft might observe an enemy target and need to notify others in the TDL of its target acquisition. The aircraft 69 will likely locate the target in space using its sensors and onboard positioning equipment. It will also provide some identification, including possibly the target type and how confident it is that the identification is accurate.

As indicated in FIG. 1 at 70, the TDL participant aircraft 69 transmits a TDL message containing the observations into the TDL 10. This message is received by others in the TDL and eventually by the TDL Gateway block 30, as shown at arrow 80.

As indicated in FIG. 1 at 90 the TDL Gateway 30 receives the message(s) and correlates it with other messages being received from other sources that may reference the same target. The TDL Gateway 30 stores the resulting correlated "track" in its Track database 32.

As indicated in FIG. 1 at 100, the contents of the Track database 32 are "published" to the IP network 20 using the Web Server 33. Publishing is the act of making data available to the Web. That data can be either pushed out to the clients by the server, "server push" (e.g. by a system such as HTTP Server Push) or the clients can poll to get the data, "client pull". The latter "client pull" way of publishing, by polling, is the preferred way of publishing in the present invention, but using "server push" is also taught by the present invention. The use of the term "polling" in the present invention, whenever referencing the exchange or publishing of information between client and server, encompasses both the "server push" and the preferred method of "client pull". The publication can take any of several forms including a variety of simple HTTP interfaces (e.g. CGI, cgi-bin, PHP, Java Servlet, and the like) or something more complicated, like a SOAP web service.

As indicated in FIG. 1 at 110 the SA Browser 40 application queries the Web Server 33 for new track information. The query will likely be filtered in some way. For example, the SA Browser user may want to see tracks in a specified geographical region. There are many other types of filters that might be useful, e.g. time-based, friendly-only, enemy-only, and the like. The SA browser 40 will likely be presenting the information in a context that is useful to the user and will only need to acquire tracks from the Track database 32 that are useful in that context. Filtering allows that context to be applied to the queries.

As indicated in FIG. 1 at 120, if the SA Browser 40 is mashing data against maps, it will query a Maps Server 50 (e.g. FalconView or Google Maps) for map images that can be used for display in the SA Browser 40.

As indicated in FIG. 1 at 130, if the tracks being displayed by the SA Browser 40 correspond to well-known objects, it is likely that standard symbology will be used to present the tracks graphically in a standard way (e.g. MIL-STD-2525 or MIL-STD-1790 symbology). The SA Browser 40 can query a Symbology Server 60 to acquire specific symbols that correspond to the tracks in its context.

In the present invention the architecture disclosed herein is at a logical, functional level. That means that the present invention can not only be implemented as disclosed herein, but also implemented in a variety of different equivalent ways that achieve the same function, as can be appreciated by one of ordinary skill using the teachings of the present invention.

The architecture of the present invention can be implemented on many scales. The architecture could be implemented as the basic implementation approach of a flight deck on a carrier, e.g. a next-gen Flight2, using the internet. Flight2 is a general term for a RCGS (Rockwell Collins Government Systems) cockpit solution. Flight2 includes displays, flight management, controls, and integration with various other parts of the flight deck equipment. Presently there are variations of the Flight2 implementation on at least a dozen different military aircraft.]. The architecture of the present invention could also be used to implement widely distributed SA distribution across a battlefield or across the globe, in other words, it does not have to be local. Further, the software and hardware of the present invention can be implemented in a distributed or centralized fashion. Both the hardware and/or software of the present invention may run on a single computer or all the elements might reside on different computers distributed around the world.

Further, using object oriented programming techniques, such as polymorphism and inheritance, it is possible for one software module to combine the functionality of two or more software modules written in more traditional system design, but this does not in any way change any teachings of the present invention.

The present invention could also be employed "in the reverse" to inject data from the SA Browser 40 into the TDL 10 and/or databases. A user would input data using the Web Browser 42, which would, via a HTTP request, JavaScript, and the like, communicate with the various web servers (e.g. web servers 33, 54 and 62 in the example of FIG. 1). For example, as can be appreciated by one skilled in the art using the teachings of the present invention, a user can post data to TDL Gateway 30 via the web server 33 to inject new user-defined data into the Track database 32. The new user-defined data from Track database 32 may be injected into the TDL 10 by the software running the TDL Gateway 30. A user may use the SA Browser 40 to introduce a new symbol into the Symbology database 64 by posting from the Web Browser 42 to the Web Server 62. Likewise a user may introduce a new topography into the maps database 52 by posting data from the SA Browser to the Maps server 50.

In addition, though an IP network is the preferred network for the present invention, in general any network may be employed, including ATM or a legacy network, so long as the overall client-server architecture is maintained.

Further, although the present invention has been described in terms of the preferred embodiments above, numerous modifications and/or additions to the above-described preferred embodiments would be readily apparent to one skilled in the art.

It is intended that the scope of the present invention extends to all such modifications and/or additions and that the scope of the present invention is limited solely by the claims set forth below.

We claim:

1. A client-server system for Tactical Data Link (TDL) Situational Awareness (SA) data mashups over an IP network comprising: a TDL Gateway receiving TDL data, said TDL Gateway having a TDL Gateway web server receiving processed TDL data from said TDL Gateway and interfacing said TDL Gateway to communicate over the IP network; an SA Browser having an SA Browser web client communicating with said TDL Gateway web server over the IP network; a Symbology Server; and a Maps Server, wherein: said SA Browser connects to said Maps and Symbology servers via said SA Browser web client communicating with said web servers of said Symbology Server and said Maps Server; and said SA Browser performs a mashup with graphical map data from said Maps Server, vector graphic symbol data from said Symbology Server, and said processed TDL data from said TDL Gateway.

2. The system of claim 1, wherein: said at least one other server is a server selected from the group consisting of a Maps Server and a Symbology Server.

3. The system of claim 1, further comprising: a Track database, accessible by said TDL Gateway, to store data, wherein: said TDL Gateway comprises a TDL Message Handling block to correlate said message data and store said correlated message data in said Track database; and said data in said Track database is accessed by said SA Browser web client acting through said TDL Gateway web server.

4. The invention of claim 3, further comprising: a Track database, accessible by said TDL Gateway, to store data, wherein: said TDL Gateway comprises a TDL Message Handling block to correlate said message data and store said correlated message data in said Track database; said data in said Track database is accessed by said SA Browser web client running filtered queries and acting through said TDL Gateway web server.

5. The system of claim 1, wherein: said Symbology Server is embedded within the SA Browser.

6. The system of claim 1, further comprising: a Track database, accessible by said TDL Gateway, to store data, wherein: said TDL Gateway comprises a TDL Message Handling block to correlate said message data and store said correlated message data in said Track database; said data in said Track database is accessed by said SA Browser web client acting through said TDL Gateway web server; said SA Browser is capable of injecting user-defined data into said Track database; and, said TDL Gateway is capable of introducing said user-defined data into the TDL.

7. The system of claim 1, wherein: a third server comprising a Maps Server, said Maps Server is embedded within the SA Browser, wherein: said at least one other server is a Symbology Server, said Maps and Symbology servers forming virtual servers; and, said SA Browser performs a mashup with data from said Maps Server, data from said Symbology Server, and said processed TDL data from said TDL Gateway, via said TDL Gateway web server.

8. A method comprising: receiving Tactical Data Link (TDL) data from one or more TDL nodes in a TDL network with a TDL Gateway having a TDL Gateway web server; serving processed TDL data to a Situational Awareness (SA) browser having an SA browser web client over an IP network with the TDL Gateway web server; receiving the processed TDL data with the SA browser web client; connecting the SA Browser to a maps server and a symbology server via the SA browser web client communicating with web servers of the symbology server and the maps server; and performing a mashup of the processed TDL data, vector graphic symbol data associated with the TDL data from the symbology server and the graphical map data associated with the TDL data from the maps server with the SA browser.

9. The method of claim 8 further comprising: adapting the TDL data for transport across an IP network.

10. The method of claim 8 further comprising: requesting symbology data associated with the TDL data from a symbology server; and requesting map data associated with the TDL data from a map server.

11. The method of claim 8, wherein the TDL data comprises: one or more global positioning system (GPS) coordinates associated with one or more tactical targets; and one or more identifiers associated with the one or more tactical targets.

* * * * *